US008800605B2

(12) United States Patent
Barlow et al.

(10) Patent No.: US 8,800,605 B2
(45) Date of Patent: Aug. 12, 2014

(54) MOLDED COMPOSITE MANDREL FOR A DOWNHOLE ZONAL ISOLATION TOOL

(71) Applicant: Oil States Industries, Inc., Arlington, TX (US)

(72) Inventors: James Barlow, Oologah, OK (US); Joel Barlow, Oologah, OK (US)

(73) Assignee: Oil States Industries, Inc., Arlington, TX (US)

( * ) Notice: Subject to any disclaimer, the term of this patent is extended or adjusted under 35 U.S.C. 154(b) by 0 days.

(21) Appl. No.: 13/754,355

(22) Filed: Jan. 30, 2013

(65) Prior Publication Data

US 2013/0146167 A1 Jun. 13, 2013

Related U.S. Application Data

(60) Continuation-in-part of application No. 13/194,867, filed on Jul. 29, 2011, now Pat. No. 8,398,801, which is a division of application No. 11/772,804, filed on Jul. 2, 2007, now abandoned.

(51) Int. Cl.
| | |
|---|---|
| *F16L 9/16* | (2006.01) |
| *E21B 33/12* | (2006.01) |
| *B29C 70/08* | (2006.01) |
| *B29C 70/46* | (2006.01) |
| *B29C 70/72* | (2006.01) |
| *F16L 55/11* | (2006.01) |
| *F16L 9/00* | (2006.01) |
| *B29C 53/56* | (2006.01) |
| *B29C 70/32* | (2006.01) |
| *B29C 63/06* | (2006.01) |

(52) U.S. Cl.
CPC .............. *F16L 55/1108* (2013.01); *B29C 53/56* (2013.01); *E21B 33/1204* (2013.01); *B29C 70/085* (2013.01); *B29C 70/46* (2013.01); *B29C 70/72* (2013.01); *B29C 70/32* (2013.01); *B29C 63/06* (2013.01); *F16L 9/00* (2013.01)
USPC ........................................... 138/140; 138/144

(58) Field of Classification Search
USPC .......................................... 138/140, 141, 144
See application file for complete search history.

(56) References Cited

U.S. PATENT DOCUMENTS

| | | |
|---|---|---|
| 2,143,746 A | 1/1939 | Spang |
| 4,185,689 A | 1/1980 | Harris |

(Continued)

OTHER PUBLICATIONS

"LYTEX(R) 9063 Engineered Structural Composite (ESC) Molding Compound," Product Data Sheet, Quantum Composites, Inc., Bay City, MI, one page.

(Continued)

*Primary Examiner* — Giovanna Wright
(74) *Attorney, Agent, or Firm* — Richard Auchterlonie; Novak Druce Connolly Bove + Quigg LLP

(57) ABSTRACT

A composite mandrel includes a filament-wound composite tube, and composite material molded over the filament-wound composite tube. For example, the composite material includes chopped fibers and a matrix of thermoset resin. The chopped fibers are arranged in layers upon the filament-wound composite tube, and the chopped fibers in each of the layers are randomly oriented along first and second orthogonal directions in each of the layers. The composite material includes at least one sheet of the composite material wound over the filament-wound tube, and at least one strip of the composite material wound over the sheet of the composite material and forming a head on the composite mandrel. An internal cavity of the filament-wound composite tube may provide a lumen for the composite mandrel. The internal cavity may be threaded to receive a removable bridge plug.

21 Claims, 9 Drawing Sheets

(56) References Cited

U.S. PATENT DOCUMENTS

| | | | |
|---|---|---|---|
| 4,729,806 A | 3/1988 | Stein | |
| 4,996,016 A | 2/1991 | Walls et al. | |
| 5,074,828 A | 12/1991 | Ellis | |
| 5,108,964 A | 4/1992 | Corbett et al. | |
| 5,242,720 A | 9/1993 | Blake | |
| 5,285,699 A | 2/1994 | Walls et al. | |
| 5,484,120 A | 1/1996 | Blakeley et al. | |
| 5,507,346 A | 4/1996 | Gano et al. | |
| 5,795,524 A | 8/1998 | Basso, Jr. et al. | |
| 5,799,705 A * | 9/1998 | Friedrich et al. | 138/144 |
| 5,871,604 A * | 2/1999 | Hohman | 156/62.8 |
| 6,036,470 A | 3/2000 | Basso, Jr. et al. | |
| 6,624,213 B2 | 9/2003 | George et al. | |
| 6,666,275 B2 | 12/2003 | Neal et al. | |
| 6,712,153 B2 | 3/2004 | Turley et al. | |
| 6,976,534 B2 | 12/2005 | Sutton et al. | |
| 7,124,831 B2 | 10/2006 | Turley et al. | |
| 7,735,549 B1 | 6/2010 | Nish et al. | |
| 8,398,801 B2 | 3/2013 | Barlow et al. | |
| 2002/0189820 A1 | 12/2002 | Slup et al. | |
| 2003/0188860 A1 | 10/2003 | Zimmerman et al. | |
| 2007/0039160 A1 | 2/2007 | Turley et al. | |
| 2007/0131412 A1 | 6/2007 | Finci et al. | |
| 2008/0121436 A1 | 5/2008 | Slay et al. | |
| 2008/0199642 A1 | 8/2008 | Barlow et al. | |
| 2009/0011247 A1 | 1/2009 | Barlow et al. | |
| 2011/0284153 A1 | 11/2011 | Barlow et al. | |

OTHER PUBLICATIONS

"EM 7302 Engineering Thermoset Material," Technical Data Sheet, Vyncolit NA, Manchester, CT. May 26, 2004, one page.
"Drillable Tools," Halliburton, Houston, TX, Jan. 2007, 7 pages.
"Quick Drill (TM) Composite Bridge Plug, Setting Tools, Stinger Subs, and Wireline Accessories," Baker Hughes, Houston, TX, Jan. 2007, 10 pages.

* cited by examiner

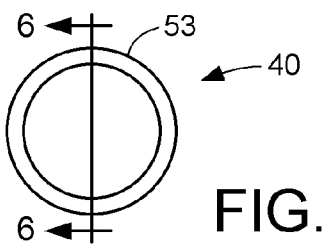
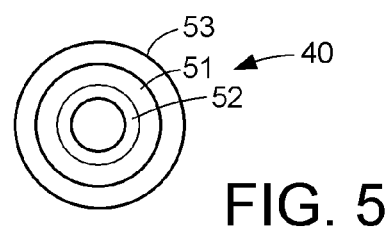
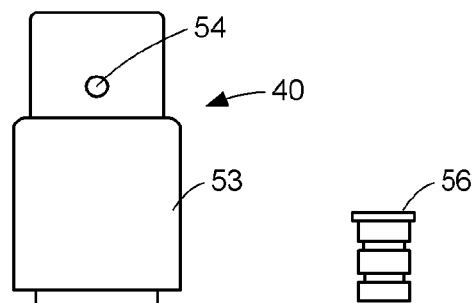
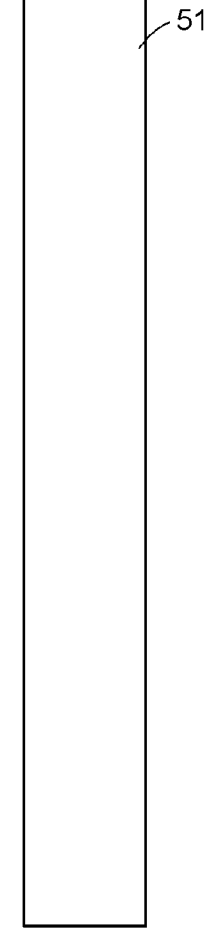
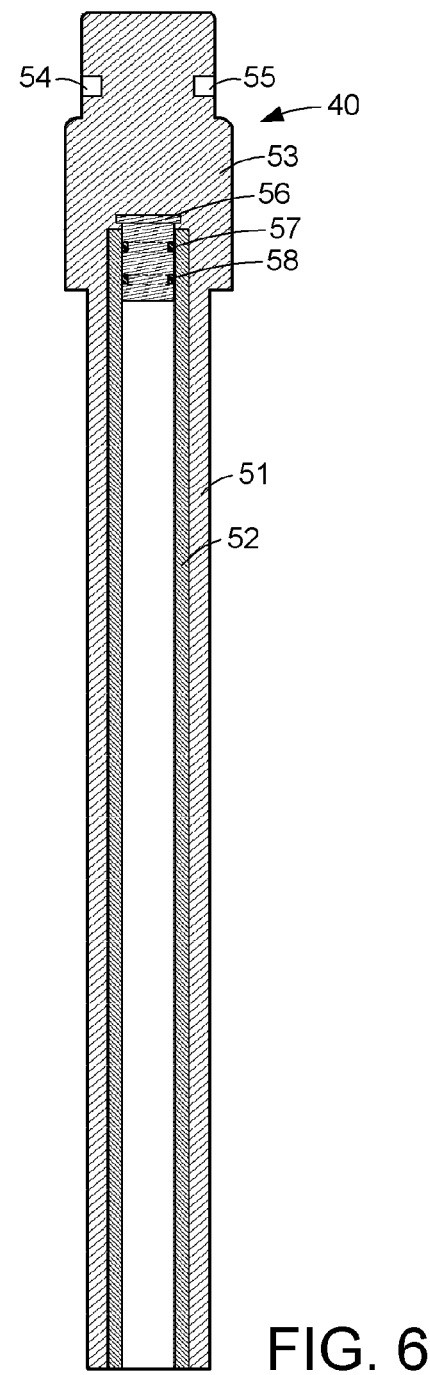

MOLDED COMPOSITE MANDREL FOR A DOWNHOLE ZONAL ISOLATION TOOL

RELATED APPLICATIONS

The present application is a divisional of U.S. patent application Ser. No. 13/194,867 filed Jul. 29, 2011 entitled "Molded Composite Mandrel for a Downhole Isolation Tool" by James Barlow and Joel Barlow, incorporated herein by reference, which is a divisional of U.S. patent application Ser. No. 11/772,804 filed Jul. 2, 2007 entitled "Molded Composite Mandrel for a Downhole Isolation Tool" by James Barlow and Joel Barlow, incorporated herein by reference.

FIELD OF THE INVENTION

The present invention relates to a molded composite mandrel for a downhole zonal isolation tool.

BACKGROUND OF THE INVENTION

A downhole zonal isolation tool often is used for stimulation or service work upon a well. For example, the zonal isolation tool is a bridge plug, frac plug, or packer for bridging a hole or gap of a metal tubular such as a well casing.

The zonal isolation tool typically has an internal elongated mandrel and a circular array of slips mounted on the mandrel at each end of the tool. Each slip has an outer surface adapted for engagement with the internal surface of the well casing. Each slip also has an inclined inner surface. Each array of slips is disposed next to a respective conical ring mounted on the mandrel for sliding under the inclined inner surfaces of the slips in the array. In the middle of the zonal isolation tool, rings of elastomeric sealing material are mounted on the mandrel between the conical rings.

When a setting tool pulls the mandrel in the longitudinal direction, the rings of sealing material expand outward in the radial direction to seal the well casing. In addition, the conical rings slide under the slips and force the slips outward in the radial direction into engagement with the well casing. The slips lock the zonal isolation tool in place inside the well casing in such a way that the rings of sealing material remain in compression for sealing the well casing when the setting tool is removed.

The zonal isolation tool can be designed to be retrievable and reusable after it has been set in the well casing. However, the zonal isolation tool is most economical to manufacture when it has been constructed to become permanently set in the well casing so that it must be drilled out destructively to unseal the well casing.

Traditionally, such a drillable zonal isolation tool has been made of a cast iron mandrel and cast iron slips.

A number of downhole tool makers have replaced the cast iron components of the zonal isolation tools with composite components of epoxy fiberglass. The composite components can be drilled out faster than cast iron, and the drilled-out chips of composite material are lighter than cast iron chips so that the composite chips are more easily flushed out of the tubular member with drilling fluid. The composite downhole tools are also lighter than the cast iron downhole tools and can be used in both high and low pH environments. Details of construction of such composite zonal isolation tools are found, for example, in Turley et al. U.S. Pat. No. 6,712,153, issued Mar. 30, 2004, incorporated herein by reference, and in Sutton et al., U.S. Pat. No. 6,976,534 issued Dec. 20, 2005, incorporated herein by reference.

When set by a setting tool, the composite mandrel must sustain tension in the longitudinal direction of up to about 12,000 psi, as well as compression in the radial direction of up to about 40,000 psi. The composite mandrel must also sustain internal pressure of well bore fluid. Due to these forces, the fiber reinforcement of the composite material should have a degree of directional orientation.

The composite mandrel has been fabricated from a composite head plug and a pair of coaxial and filament-wound composite tubes. The filament-wound tubes included alternate layers of diagonal and radial fiber, for example, diagonal layers of fiber wound criss-cross at 22 degrees interleaved with layers of fiber wound in a circumferential wrap. Each composite tube was wound on a respective steel mandrel. The outer cylindrical surface of the inner composite tube was ground to match the inner diameter of the outer composite tube, so that the inner composite tube could be closely fitted into the outer composite tube. The composite head plug was also inserted into the outer composite tube, and the composite head plug and the composite tubes were pinned and glued together. Such a composite mandrel was rather expensive due to the cost of the head plug and the cost of the two composite tubes, and the cost of grinding the inner composite tube.

SUMMARY OF THE INVENTION

It is desired to decrease the cost of fabricating a composite mandrel for a downhole zonal isolation tool.

In accordance with one aspect, the invention provides a composite mandrel including a filament-wound composite tube, and composite material molded over the filament-wound composite tube.

In accordance with another aspect, the invention provides a composite mandrel for a downhole zonal isolation tool. The composite mandrel includes a filament-wound composite tube, and composite molding sheet material wound over and molded over the filament wound tube. The composite molding sheet material includes chopped fibers and a matrix of thermoset resin. The chopped fibers are arranged in layers over the filament-wound composite tube, and the chopped fibers in each of the layers are randomly oriented along first and second orthogonal directions in each of the layers. The composite molding sheet material includes at least one sheet of the composite molding sheet material wound over the filament-wound tube, and at least one strip of the composite molding sheet material wound over the sheet of the composite molding sheet material and forming a head on the composite mandrel.

BRIEF DESCRIPTION OF THE DRAWINGS

Additional features and advantages of the invention will be described below with reference to the drawings, in which:

FIG. 3 is a top view of the composite mandrel in the bridge plug tool of FIG. 1;

FIG. 4 is a side view of the composite mandrel of FIG. 3;

FIG. 5 is a bottom view of the composite mandrel of FIG. 3;

FIG. 6 is a lateral cross-section of the composite mandrel along line 6-6 in FIG. 3;

FIG. 7 is a side view of an internal plug of the composite mandrel;

Figure 1:
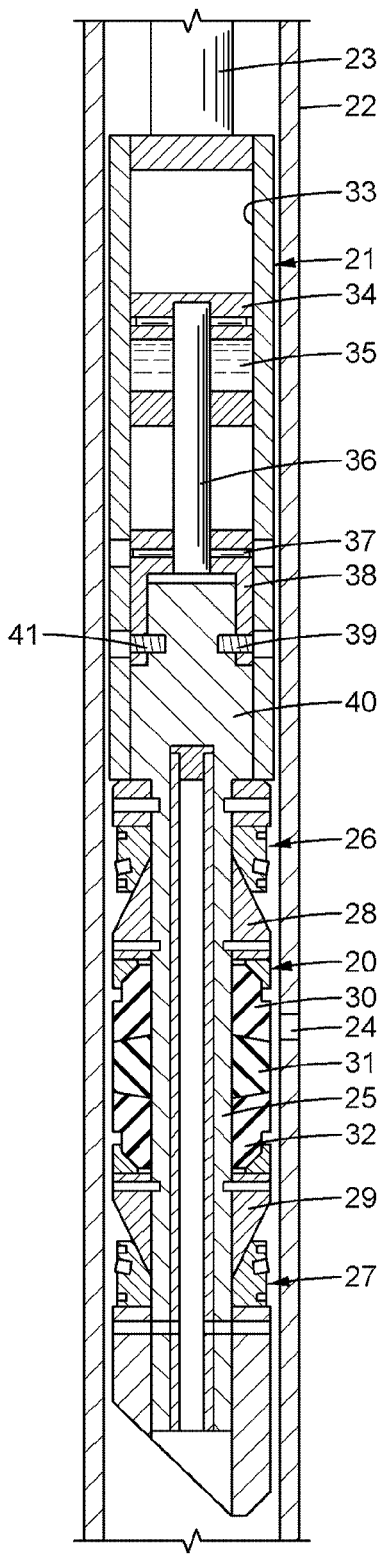
FIG. 1 is a lateral cross-section of a bridge plug tool and a setting tool in a well casing prior to setting of the bridge plug tool.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a lateral cross-section of a bridge plug tool 20 and a setting tool 21 in a well casing 22 prior to setting of the bridge plug tool. For example, the bridge plug tool 20 and the setting tool 21 are lowered by a conduit 23 into the well casing 22 in order to seal a perforation 24 in the well casing 22.

The bridge plug tool 20 has an internal elongated mandrel 25 and a respective circular array of slips 26, 27 mounted on the mandrel at each end of the bridge plug tool. Each slip has an outer surface adapted for engagement with the internal surface of the well casing 22. Each slip also has an inclined inner surface. Each array of slips 26, 27 is disposed next to a respective conical ring 28, 29 mounted on the mandrel 25 for sliding under the inclined inner surfaces of the slips in the array. In the middle of the sealing tool, rings 30, 31, 32 of elastomeric sealing material are mounted on the mandrel between the conical rings 28, 29.

Once the bridge plug tool 20 has been aligned with the perforation 24, the setting tool 21 is activated. For example, the setting tool 21 has a cylinder 33 and a piston 34 driven by fluid 35 under pressure, such as hydraulic fluid or gas generated by a pyrotechnic charge. The piston 34 has a shaft 36 coupled by a pin 37 to a receptacle 38 for the head 40 of the mandrel 25 for pulling the mandrel in the longitudinal direction.

Figure 2:
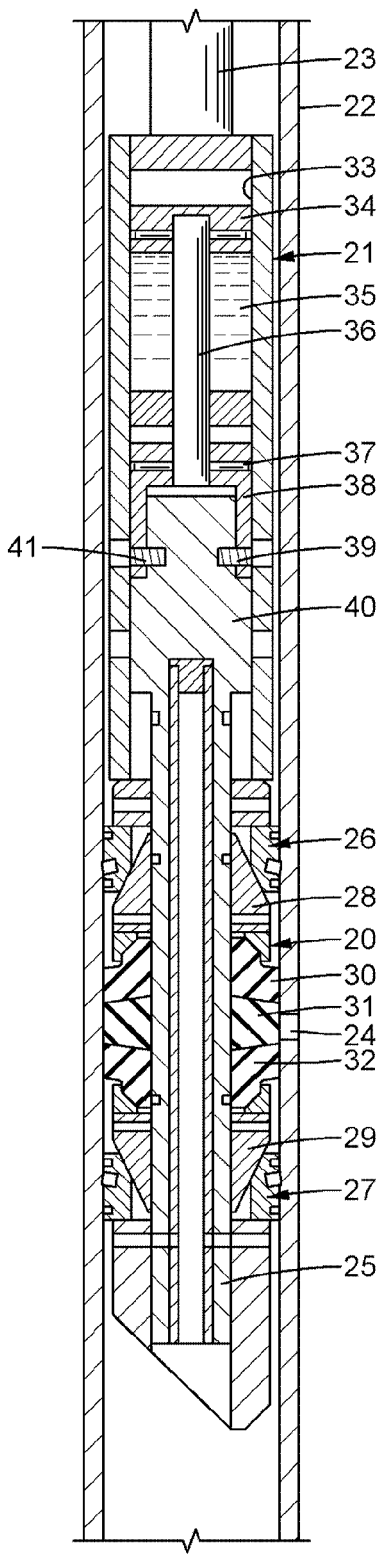
FIG. 2 shows the bridge plug tool and the setting tool of FIG. 1 once the bridge plug tool has been set within the well casing.
Figure 8:
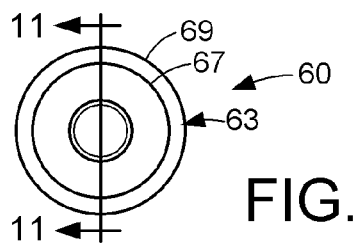
FIG. 8 is a top view of an alternative construction of a composite mandrel permitting a bridge plug to be inserted into or removed from the mandrel when the mandrel has been assembled into a downhole tool.

As shown in FIG. 2, when the piston 34 of the setting tool 21 pulls the mandrel 25 of the bridge plug tool 20, the rings 30, 31, and 32 of sealing material expand outward in the radial direction to seal a zone of the well casing 22. In addition, the conical rings 28, 29 slide under the arrays of slips 26, 27 and force the slips outward in the radial direction into engagement with the inner wall of the well casing 22. The slips lock the bridge plug tool 20 in place inside the well casing 22 in such a way that the rings of sealing material 30, 31, 32 remain in compression for sealing the perforation 24 in the well casing when the setting tool 21 is removed. For example, continued motion of the piston 34 causes pins 39, 41 to shear, so that the bridge plug tool 20 becomes uncoupled from the setting tool 21. Then the conduit 23 pulls the setting tool 21 out from the well casing 22.

If later it is desired to remove the bridge plug tool 20 from the well casing 22, then the bridge plug tool is drilled out destructively. For fast drill-out, light weight, and tolerance of high and low pH environments, the bridge plug tool 20 is comprised of composite material such as epoxy fiberglass. For example, the epoxy resin is a 50:50 blend by weight of a cycloaliphatic epoxy resin and an epoxy resin of bisphenol A and epichlorohydrin.

The composite mandrel 40 is a relatively expensive component of the bridge plug tool 20 because the composite mandrel must sustain tension in the longitudinal direction of up to about 12,000 psi, as well as compression in the radial direction of up to about 40,000 psi. The composite mandrel must also sustain internal pressure of well bore fluid. In order to sustain these forces, the composite mandrel has been fabricated from an outer composite tube and an inner composite tube. Each of the composite tubes has been made by a filament winding process. The filament winding process is relatively slow and requires the use of a machine tool. Therefore, it is desired to eliminate the filament winding process.

It has been found that it is possible to eliminate the filament winding process for the outer composite tube of the composite mandrel by replacing the outer composite tube with an over-molded composite structure. The over-molded composite structure is fabricated from engineered structural composite molding sheet compound by winding at least one sheet of the composite molding sheet compound over the inner composite tube and by fusing the layers of the composite molding sheet compound in a molding process. The composite molding sheet compound includes chopped reinforcement fibers of generally constant length that are laid down generally flat on the sheet but in random directions in the plane of the sheet. Thus, the winding of composite molding sheet compound over the inner composite tube results in a distribution of reinforcement fiber orientation including hoop-wound fiber and diagonal fiber in a fashion similar to the conventional filament winding process. However, sheets and strips of the composite molding sheet compound can be wound quickly by hand over the inner composite tube. Therefore it is possible to reduce the cost of manufacturing the composite mandrel by about 30 to 40 percent.

FIGS. 3, 4, 5, and 6 show that the composite mandrel 40 includes an outer tube 51 of composite molding sheet material wound over and molded over an inner filament-wound tube 52. The composite mandrel 40 also includes a head 53 formed of the over-molded composite material integral with the outer tube 51. The molding process produces two cavities 54 and 55 in the head 53. Prior to the molding process, an internal plastic plug 56 is fitted with two rubber O-rings 57 and 58 and inserted into the head end of the inner wound composite tube 52.

Figure 10:
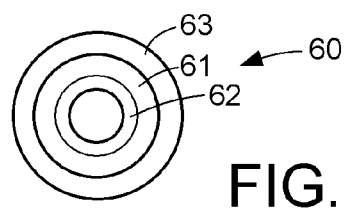
FIG. 10 is a bottom view of the composite mandrel of FIG. 8.
Figure 11:
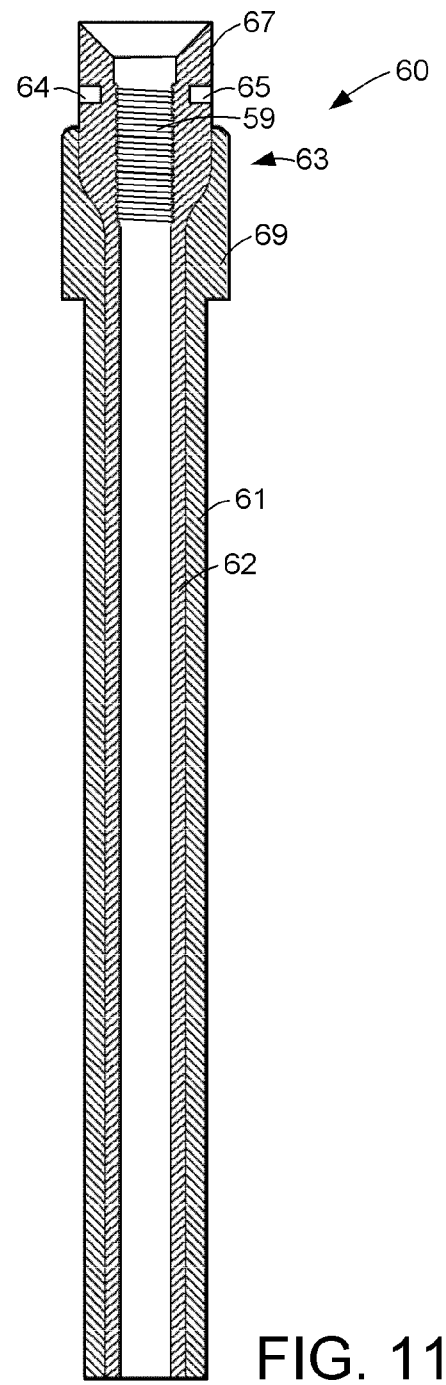
FIG. 11 is a lateral cross-section of the composite mandrel along line 11-11 of FIG. 8.
Figure 14:
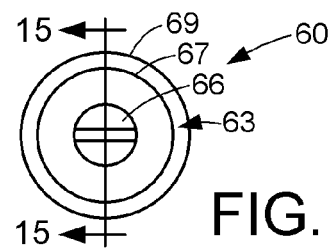
FIG. 14 is a top view of the composite mandrel of FIG. 8 after the bridge plug of FIG. 13 has been inserted into the mandrel.

FIGS. 8, 9, 10, and 11 show an alternative construction of a composite mandrel 60 permitting a bridge plug (66 in FIG. 13) to be inserted into or removed from the mandrel 60 when the mandrel has been assembled into a downhole tool. The composite mandrel 60 includes an outer tube 61 of composite molding sheet material wound over and molded over an inner filament-wound tube 62. The composite mandrel 60 also includes a head 63 including a lower portion 69 of over-molded composite material integral with the outer tube 61, and an upper portion 67 of filament-wound composite material integral with the inner tube 62. Two cavities 64 and 65 are milled into the upper portion 67 of the head 63. Threads 59 are formed in a central cavity of the inner filament-wound tube 62. For example, after over-molding of the outer tube 61 upon the inner filament-wound tube 62, the threads 59 are cut with a tap. The threads 59 permit a bridge plug (66 in FIG. 13) to be screwed into the central cavity of the inner filament-wound tube 62. As shown in FIG. 11, when the bridge plug is absent, the central cavity of the inner filament-wound tube 62 provides a lumen for the composite mandrel to permit the flow of fluid through the down-hole zonal isolation tool including the mandrel.

Figure 12:
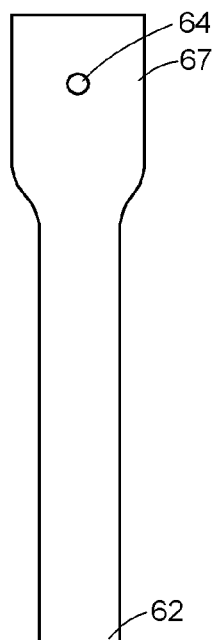
FIG. 12 is a side view of a fiber-wound tube in the composite mandrel of FIG. 8.

FIG. 12 shows a side view of the inner filament-wound tube 62 and integral upper head portion 67.

Figure 13:
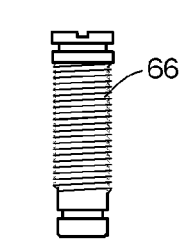
FIG. 13 is a side view of the bridge plug that may be inserted into or removed from the mandrel when the mandrel has been assembled into a downhole tool.
Figure 15:
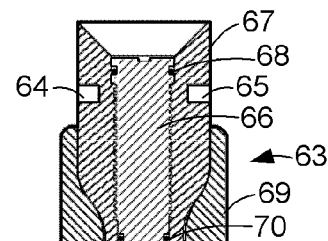
FIG. 15 is a lateral-cross section of the composite mandrel along line 15-15 of FIG. 14.

As shown in FIG. 15, after the composite mandrel 60 has been fabricated, or after the composite mandrel has been assembled into a downhole tool, the bridge plug 66 (as shown in FIG. 13) can be fitted with rubber O-rings 68, 70 and then screwed into the upper head portion 67 to plug the inner tube 62. The bridge plug 66, for example, is made of epoxy reinforced with randomly-oriented chopped fiberglass.

Figure 9:
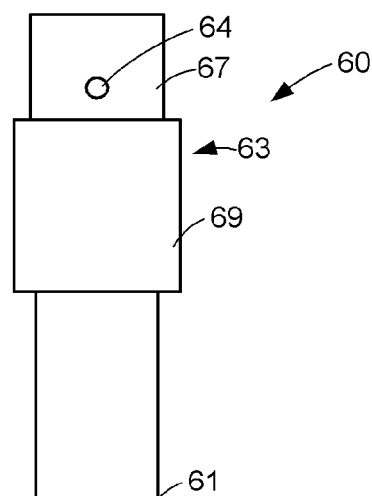
FIG. 9 is a side view of the composite mandrel of FIG. 8.

Preferably the inner filament-wound tube 52 of the mandrel 40 of FIGS. 3-6 and the inner filament-wound tube 62 of the mandrel 60 of FIGS. 9-11 are fabricated by a filament winding process in which nine filaments are wetted with epoxy resin and then wound simultaneously under tension over a one-inch diameter steel mandrel. Each of the nine filaments includes more than 100 glass fibers. Initially the steel mandrel is fabricated by grinding, chrome plating, and polishing. The nine filaments are spaced over a one-half inch wide length of the mandrel during the winding process to form ten layers. The ten layers include alternate layers of hoop-wound filaments and layers of criss-cross diagonal filaments at 22 degrees with respect to the axis of the steel mandrel. After winding and curing, the outer diameter of the inner filament-wound tube is approximately 1 and 5/8 inches. Then the outer diameter of the inner filament-wound tube is ground down to 1 and 9/16 inches, and its length is trimmed to 22 inches. Then a hydraulic press removes the inner filament-wound tube from the steel mandrel.

FIGS. 16 to 21 show a method of manufacturing the mandrel 40 of FIGS. 3-6 by rolling sheets and strips of engineered structural composite molding sheet material upon the inner filament wound tube 52. Preferably the engineered structural composite molding sheet material is LYTEX 9063 (Trademark) sheet molding compound obtained from Quantum Composites Inc., 1310 South Valley Center Drive, Bay City, Mich., 48706. LYTEX 9063 sheet molding compound contains 63 weight percent of 1" chopped glass fiber and 37 weight percent of epoxy resin compound. The glass fiber diameter is 13 microns. The epoxy resin compound is formulated with bisphenol A type epoxy resin, acid anhydride hardener and additives.

The composite molding sheet material is obtained in the form of two sheets that are 18 inches wide, 26 inches long, and 0.10 inches thick. A 2 inch by 26 inch strip is cut from the end of one of these sheets, and three 3-1/4 inch by 26 inch strips are cut from the other one of the sheets. All pieces are weighted, and the total weight all pieces should be 2800 grams to 2830 grams. If there is excess weight, then the extra weight is cut off the 26 inch ends of the pieces. If additional weight is needed, then a narrow strip of material is wrapped around the center of the head after all of the pieces have been wrapped, as described below.

Figure 21:
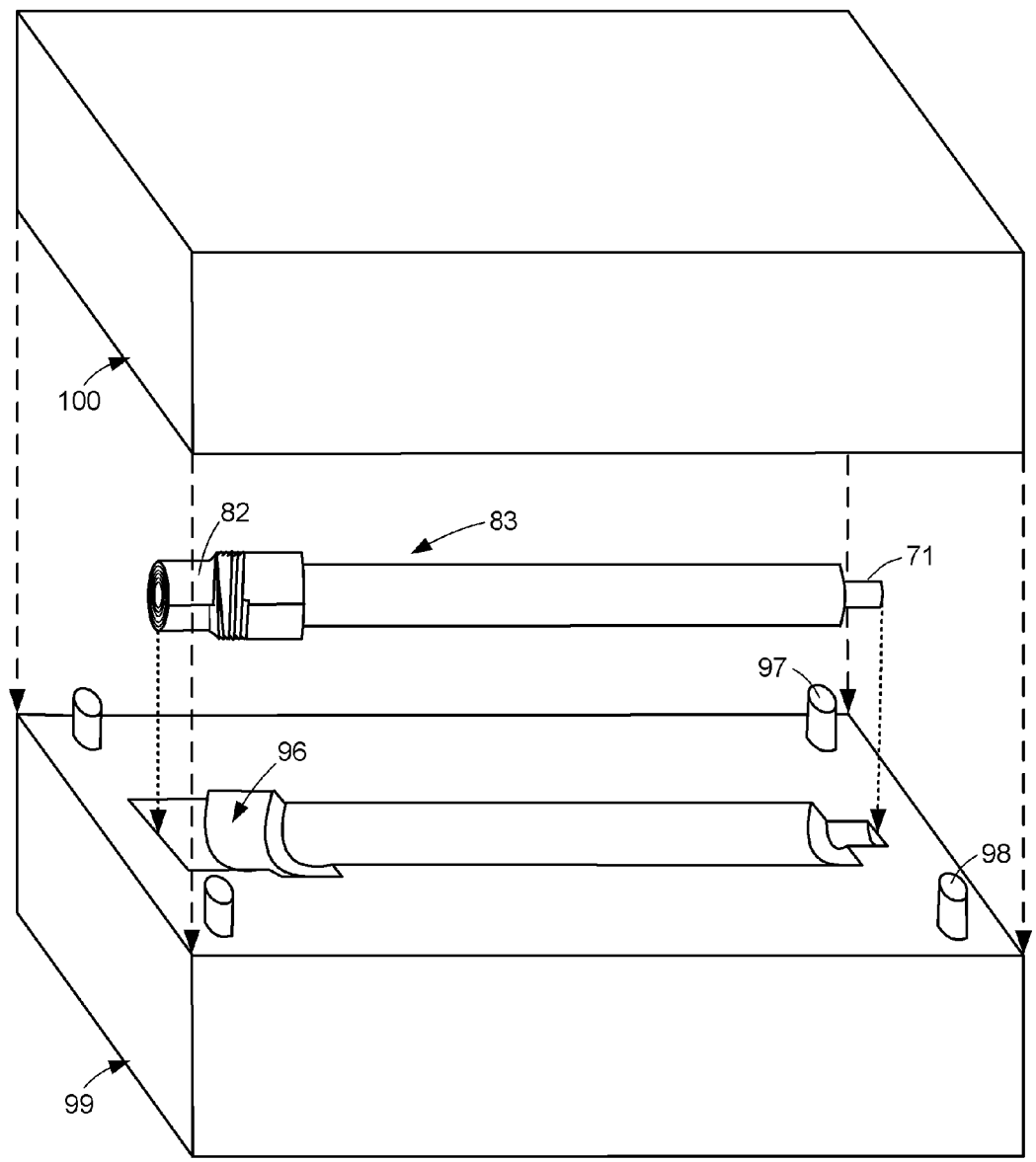
FIG. 21 shows the final assembly of FIG. 20 being placed into a two-piece compression mold.

A mold (as shown in FIG. 21) is installed in a press, and the mold is preheated. The mold temperature is set to 300 to 310 degrees Fahrenheit. The clamp pressure on the press is set to 370 tons, and the closing speed of the press (when slow closing starts) is set to 45 seconds.

Figure 16:
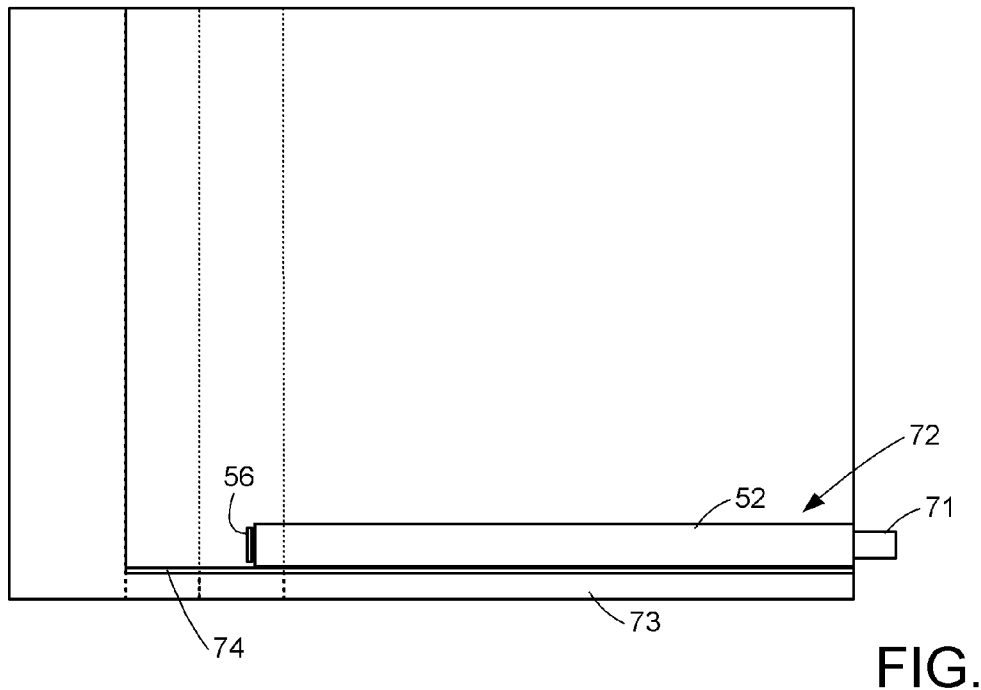
FIG. 16 shows a first sheet of composite molding material being rolled upon an assembly of a fiber-wound tube and an internal plug and a steel core.

A film of wax is put on all parts of the mold and on a steel core (71 in FIG. 16). The steel core is similar to the steel mandrel used for winding the inner tube (52 in FIG. 16) but it has a shorter length of 22 and 1/4 inches. The steel core is installed into the inner fiber-wound tube with 1.6 inches of the steel core protruding from one end of the inner fiber-wound tube. At the opposite end of the inner fiber-wound tube, one drop of oil is put around the inside hole of the inner fiber-wound tube, and then the internal plug (56 in FIG. 16, with two O rings 57 and 58 installed as shown in FIG. 6) is inserted into this hole by twisting and pushing by hand. The exposed surfaces of this inner core assembly (72 in FIG. 16) are washed with acetone, and then this inner core assembly is pre-heated to 140 to 160 degrees Fahrenheit.

For rolling the composite molding sheet material upon the inner filament wound tube 52, the composite molding sheet material is softened by heating in an open air oven. The oven is pre-heated to 150 degrees Fahrenheit. Then the sheets of the composite molding sheet material are placed on cardboard in the oven for about 5-10 minutes or until the sheets are soft enough to roll. The sheets should not be stacked in the oven or left in the oven any longer than needed to soften them. The sheets are taken out of the oven one piece at a time.

A first sheet (16"×26") is taken out of the oven, and placed on an aluminum plate 73 as shown in FIG. 16 so that its right side is even and aligned with the right side of the aluminum plate. Then the inner core assembly 72 is rolled tight with the sheet 74 aligned to roll flush with the right end of the inner core 52 and the right side even with the aluminum plate 73, as shown in FIG. 16. The steel core 71 sticks out over the right side of the aluminum plate by 1.6 inches.

Figure 17:
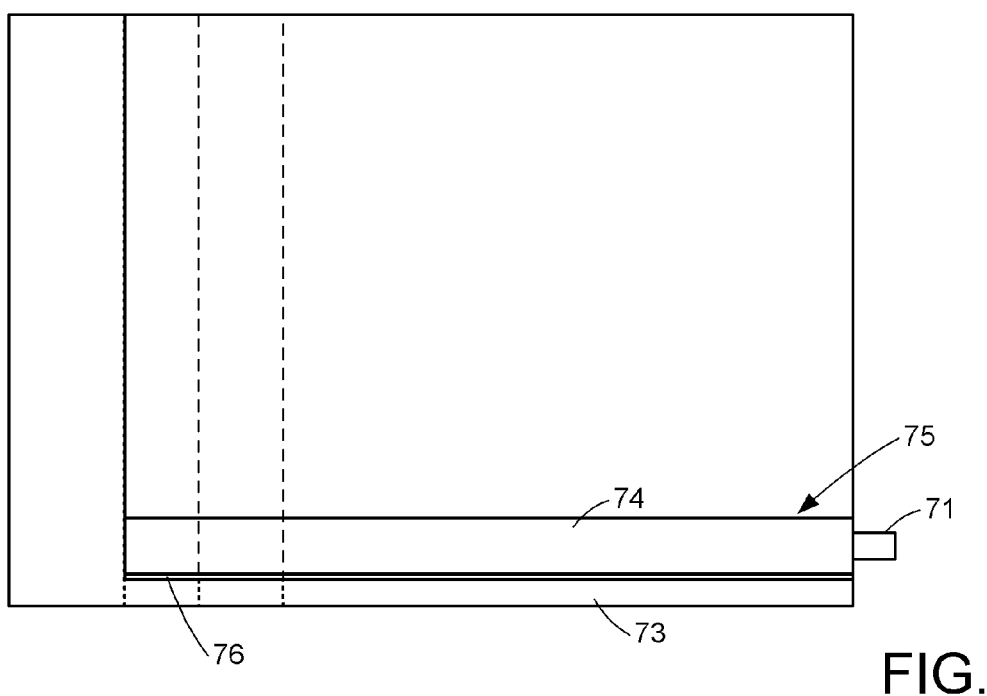
FIG. 17 shows a second sheet of composite molding material being rolled upon the assembly of FIG. 16.

A second sheet 76 (10 1/4"×26") is taken out of the oven, and placed on the aluminum plate 73 as shown in FIG. 16 so that its right side is even and aligned with the right side of the aluminum plate. Then the wrapped inner core assembly 75 is placed on the second sheet 76 so that the 26" end of the first sheet 74 overlaps the 26" end of the second sheet by 1/4 inch, and the wrapped inner core assembly is rolled tight with the second sheet aligned to roll flush with the right end of the inner core and the right side even with the aluminum plate, as shown in FIG. 17.

Figure 18:
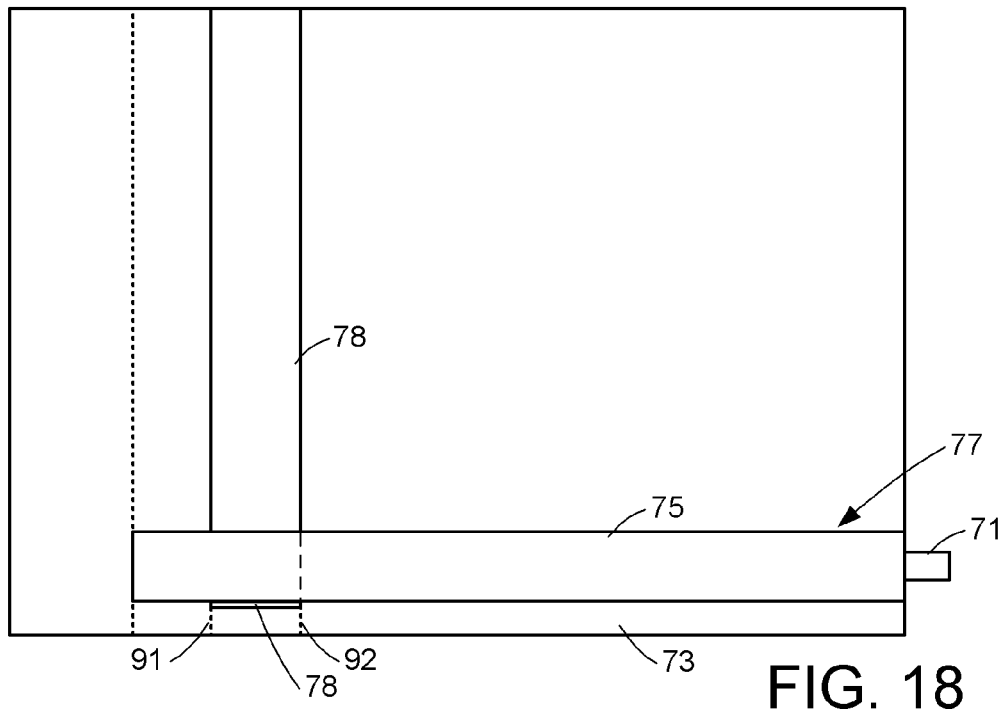
FIG. 18 shows a strip of composite molding material being rolled upon the assembly of FIG. 17 to form a head upon the assembly.

A first one of the 3-¼ inch×26" strips 78 is taken out of the oven, and placed on the aluminum plate 73 in alignment with a pair of lines 91, 92 on the aluminum plate, as shown in FIG. 18. Then the wrapped inner core assembly 77 is placed on this first 3-¼ inch strip so that the 26" end of the second sheet overlaps the 3-¼" end of the first 3-14 inch strip by ¼ inch, and the wrapped inner core assembly is rolled tight with the right ends of the first and second sheets aligned even with the right end of the aluminum plate, as shown in FIG. 17.

Then a second one of the 3-¼ inch×26" strips is taken out of the oven, and placed on the aluminum plate in alignment with the pair of lines 91, 92 on the aluminum plate 73. Then the wrapped inner core assembly is placed on this second 3-¼ inch strip so that the 3-¼" end of the first strip overlaps the 3-¼" end of the second 3-14 inch strip by ¼ inch, and the wrapped inner core assembly is rolled tight with the right ends of the first and second sheets aligned even with the right end of the aluminum plate.

Then a third one of the 3-¼ inch×26" strips 79 is taken out of the oven, and placed on the aluminum plate in alignment with the pair of lines 91, 92 on the aluminum plate 73. Then the wrapped inner core assembly is placed on this third 3-¼ inch strip so that the 3-¼" end of the second strip overlaps the 3-¼" end of the third 3-¼ inch strip by ¼ inch, and the wrapped inner core assembly is rolled tight with the right ends of the first and second sheets aligned even with the right end of the aluminum plate.

Figure 19:
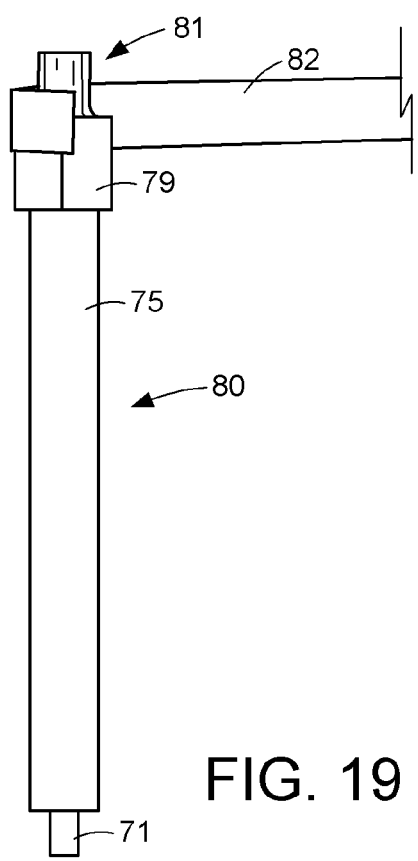
FIG. 19 shows a strip of composite molding material being wrapped above the head of the assembly of FIG. 18.
Figure 20:
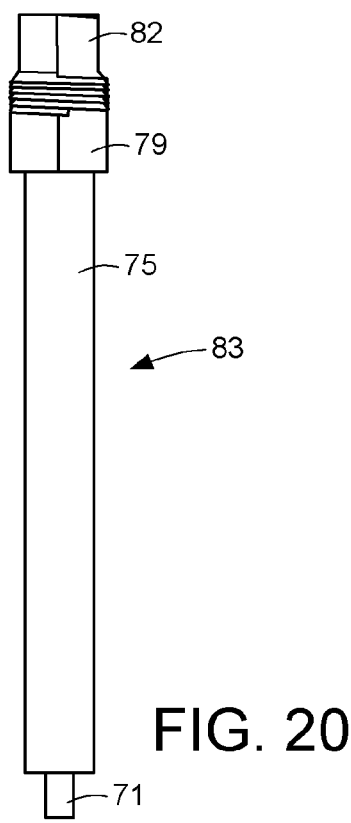
FIG. 20 shows a final assembly resulting from the wrapping begun in FIG. 19.

At this point an upper part 81 of the wrapped inner core assembly 80 is crimped to eliminate the cylindrical cavity formed by the winding of the first and second sheets 74, 75 over the inner fiber-wound tube 52 and the internal plug 56. Then, as shown in FIG. 19, the 2"×26" strip 82 is wrapped around the end above the head with it flaring up around the side of the 3-¼" wraps, in order to produce the final wrapped assembly 83 shown in FIG. 20.

As shown in FIG. 21, the mold is loaded with the final wrapped assembly 83 so that the head wraps are placed in the large diameter region 96 of the cavity and the protruding end of the steel core 71 is received in the right end of the cavity between the pins 97, 98 on the right side of the mold. The final wrapped assembly 83 should be fitted so that the outer end of the 2"×26" strip 82 is tucked into the cavity of the lower mold piece 99 and the mold pieces 99, 100 close together over the final wrapped assembly. The composite mandrel is cured in the heated mold under pressure for 60 minutes, and then the mold is opened slowly on ejector pins. Then the steel core 71 is pulled out from the composite mandrel.

Figure 22:
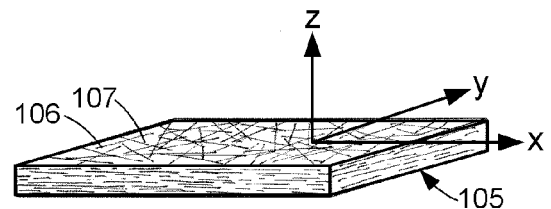
FIG. 22 shows orientations of chopped glass fiber in the composite molding sheet material.

FIG. 22 shows a rectangular piece 105 of the composite molding sheet material including chopped glass fibers 106, 107. Also shown are x, y and z axes aligned so that the z axis is perpendicular to the sheet of the composite molding sheet material. When viewed along the "z" direction, the glass fibers 106, 107 appear to be randomly oriented in the x-y plane. When viewed along the "x" direction, the glass fibers 106, 107 appear to be oriented along the "y" direction. When viewed along the "y" direction, the glass fibers 106, 107 appear to be oriented along the "x" direction.

Figure 23:
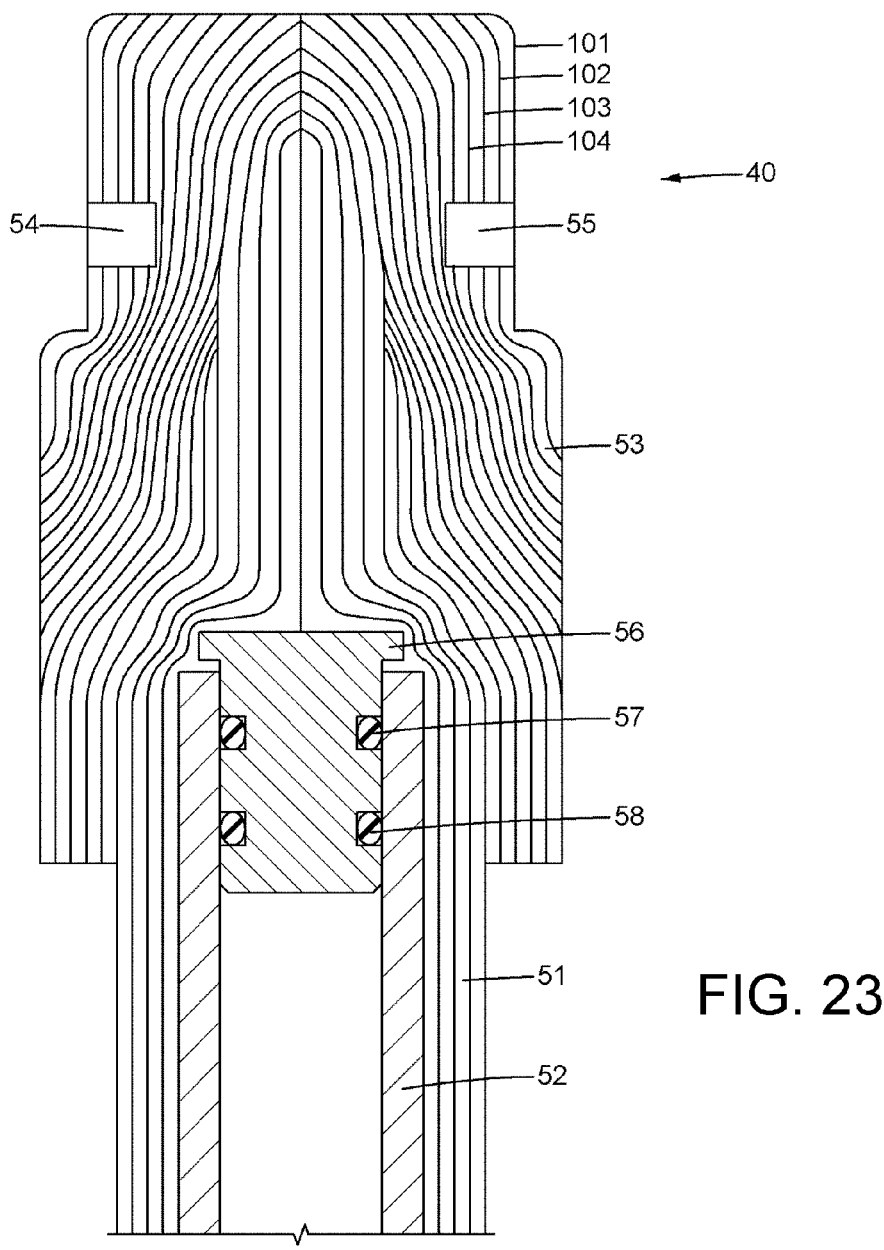
FIG. 23 shows a lateral cross-section of the sheets of composite molding sheet material in the composite mandrel of FIG. 4 during the molding process.

FIG. 23 shows a lateral cross-section of the sheets of composite molding sheet material in the composite mandrel 40 of FIG. 4 during the molding process, before the layers of the sheets fuse together. Therefore this lateral cross-section indicates the directionality of the glass reinforcement fiber. The glass fibers are generally parallel to the planar interfaces between adjacent layers of the sheets. Thus, there is relatively high tensile strength in the direction of the spaced lines 101, 102, 103, 104, etc., which represent the planar interfaces between the adjacent layers of the sheets, so that the composite mandrel has high tensile strength along its length.

Figure 24:
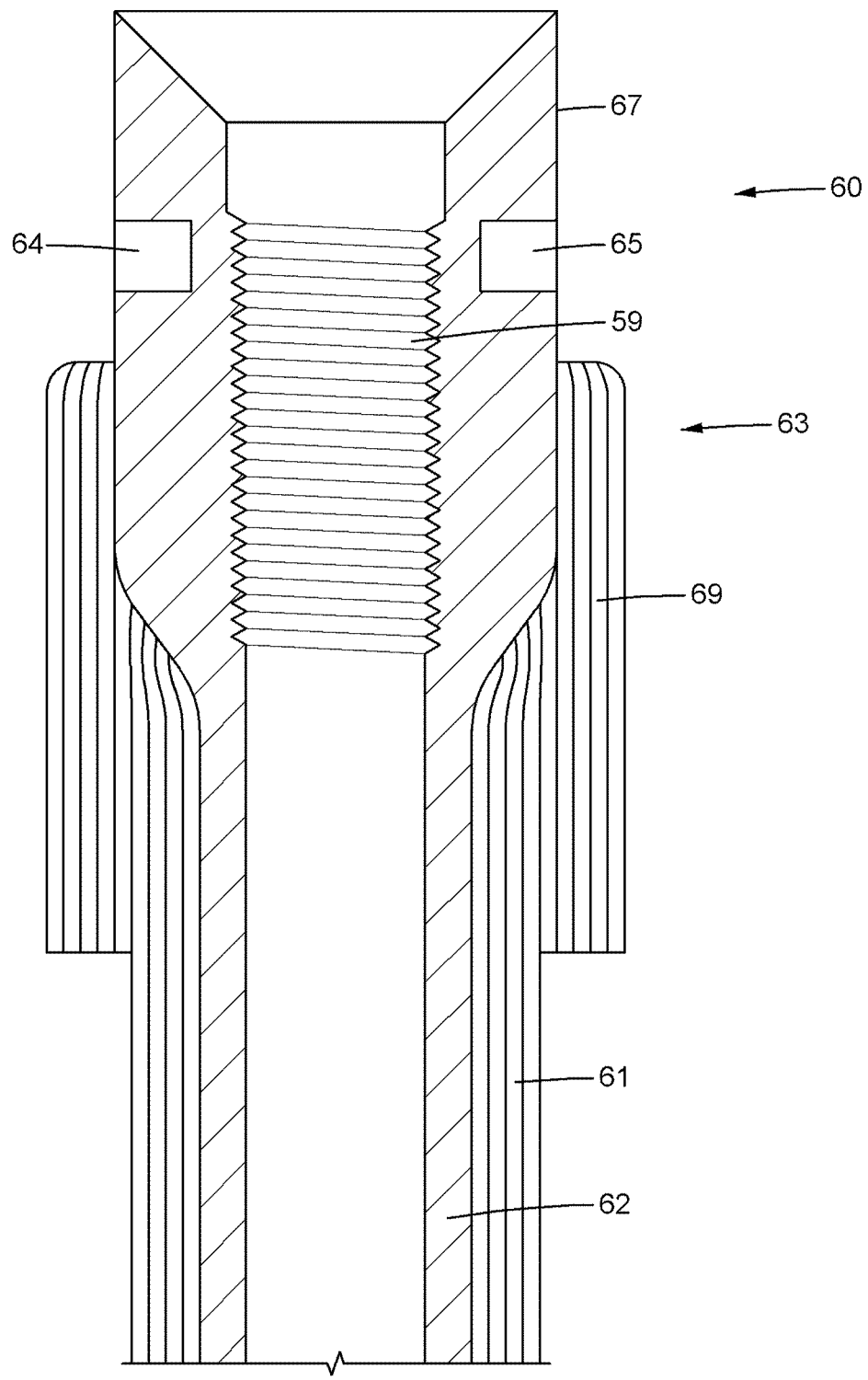
FIG. 24 shows a lateral cross-section of the sheets of composite molding sheet material in the composite mandrel of FIG. 11 during the molding process.

FIG. 24 shows a lateral cross-section of the sheets of composite molding sheet material in the composite mandrel of FIG. 11 during the molding process, before the layers of the sheets fuse together. This lateral cross-section indicates that the composite mandrel can be manufactured as shown in FIGS. 16-18 by rolling the fiber-wound core 63 over sheets and strips of the composite molding sheet material. In this case the sheets can be about 22.7 inches long instead of 26 inches long, and there is no need for a 2" wide head wrap.

In view of the above, the cost of manufacturing a composite mandrel is reduced by winding sheets or strips of composite molding sheet material instead of winding continuous filaments of fiber reinforcement. The composite mandrel includes a filament-wound composite tube, and composite material molded over the filament-wound composite tube. For example, the composite material includes chopped fibers and a matrix of thermoset resin. The chopped fibers are arranged in layers upon the filament-wound composite tube, and the chopped fibers in each of the layers are randomly oriented along first and second orthogonal directions in each of the layers. The composite material includes at least one sheet of the composite material wound over the filament-wound tube, and at least one strip of the composite material wound over the sheet of the composite material and forming a head on the composite mandrel. An internal cavity of the filament-wound composite tube may provide a lumen for the composite mandrel. In this case, the internal cavity of the filament-wound composite tube may be threaded to receive a removable bridge plug.

What is claimed is:

1. A composite mandrel comprising;
   a filament-wound composite tube; and
   composite material molded over the filament-wound composite tube;
   wherein the composite material includes chopped fibers and a matrix of thermoset resin;
   wherein the chopped fibers are arranged in layers upon the filament-wound composite tube, and the chopped fibers in each of the layers are randomly oriented along first and second orthogonal directions in said each of the layers;
   wherein the composite mandrel is suitable for use as a central component of a down-hole tool; and
   wherein the chopped fibers are parallel to planar interfaces between adjacent layers.

2. The composite mandrel as claimed in claim 1, wherein the composite material has been molded over the filament-wound composite tube by shaping the composite material in a mold.

3. A composite mandrel comprising;
   a filament-wound composite tube; and
   composite material molded over the filament-wound composite tube;
   wherein the composite material includes chopped fibers and a matrix of thermoset resin;
   wherein the chopped fibers are arranged in layers upon the filament-wound composite tube and the chopped fibers in each of the layers are randomly oriented along first and second orthogonal directions in said each of the layers;
   wherein the composite mandrel is suitable for use as a central component of a down-hole tool; and
   wherein the composite mandrel is capable of sustaining tension in a longitudinal direction of 12,000 psi.

4. The composite mandrel as claimed in claim 3, wherein the composite material has been molded over the filament-wound composite tube by shaping the composite material in a mold.

5. A composite mandrel comprising;
a filament-wound composite tube; and
composite material molded over the filament-wound composite tube;
wherein the composite material includes chopped fibers and a matrix of thermoset resin;
wherein the chopped fibers are arranged in layers upon the filament-wound composite tube, and the chopped fibers in each of the layers are randomly oriented along first and second orthogonal directions in said each of the layers;
wherein the composite mandrel is suitable for use as a central component of a down-hole tool; and
wherein the composite mandrel is capable of sustaining compression in a radial direction of 40,000 psi.

6. The composite mandrel as claimed in claim 5, wherein the composite material has been molded over the filament-wound composite tube by shaping the composite material in a mold.

7. A composite mandrel comprising:
a filament-wound composite tube; and
composite material molded over the filament-wound composite tube;
wherein the composite material includes chopped fibers and a matrix of thermoset resin;
wherein the chopped fibers are arranged in layers u s on the filament-wound composite tube, and the chopped fibers in each of the layers are randomly oriented along first and second orthogonal directions in said each of the layers;
wherein the composite mandrel is suitable for use as a central component of a down-hole tool; and
which further includes a plug in one end of the filament-wound composite tube, and wherein the plug is sealed in the filament-wound composite tube by the composite material molded over the filament-wound composite tube.

8. The composite mandrel as claimed in claim 7, wherein the composite material has been molded over the filament-wound composite tube by shaping the composite material in a mold.

9. A composite mandrel comprising:
a filament-wound composite tube; and
composite material molded over the filament-wound composite tube;
wherein the composite material includes chopped fibers and a matrix of thermoset resin;
wherein the chopped fibers are arranged in layers upon the filament-wound composite tube, and the chopped fibers in each of the layers are randomly oriented along first and second orthogonal directions in said each of the layers;
wherein the composite mandrel is suitable for use as a central component of a down-hole tool; and
wherein the composite material includes at least one sheet of the composite material wound over the filament-wound composite tube, and at least one strip of the composite material wound over said at least one sheet of the composite material, said at least one strip of the composite material forming a head on the composite mandrel.

10. The composite mandrel as claimed in claim 9, wherein the composite material has been molded over the filament-wound composite tube by shaping the composite material in a mold.

11. A composite mandrel comprising:
a filament-wound composite tube; and
composite molding sheet material wound over and molded over the filament wound composite tube;
wherein the composite molding sheet material has been molded over the filament-wound composite tube by shaping the composite molding sheet material in a mold; and
wherein the composite molding sheet material includes chopped fibers and a matrix of thermoset resin, the chopped fibers are arranged in layers over the filament-wound composite tube, and the chopped fibers in each of the layers are randomly oriented along first and second orthogonal directions in said each of the layers;
wherein the composite molding sheet material includes at least one sheet of the composite molding sheet material wound over the filament-wound composite tube, and at least one strip of the composite molding sheet material wound over said at least one sheet of the composite molding sheet material and forming a head on the composite mandrel; and
wherein the composite mandrel is suitable for use as a central component of a down-hole tool.

12. The composite mandrel as claimed in claim 11, wherein the chopped fibers are of constant length.

13. The composite mandrel as claimed in claim 11, wherein the composite mandrel is capable of sustaining tension in a longitudinal direction of up to 12,000 psi.

14. The composite mandrel as claimed in claim 11, wherein the composite mandrel is capable of sustaining compression in a radial direction of up to 40,000 psi.

15. The composite mandrel as claimed in claim 11, wherein the filament-wound composite tube provides a lumen for the composite mandrel.

16. The composite mandrel as claimed in claim 15, wherein an internal cavity of the filament-wound composite tube is threaded to receive a threaded plug for plugging the lumen of the composite mandrel.

17. The composite mandrel as claimed in claim 11, which includes a plug in one end of the filament-wound composite tube, and wherein the plug is sealed in the filament-wound composite tube by the composite molding sheet material wound over and molded over the filament-wound composite tube.

18. A composite mandrel comprising:
a filament-wound composite tube; and
composite molding sheet material wound over and molded over the filament wound composite tube;
wherein the composite molding sheet material has been molded over the filament-wound composite tube by shaping the composite molding sheet material in a mold; and
wherein the composite molding sheet material includes chopped fibers and a matrix of thermoset resin, the chopped fibers are arranged in layers over the filament-wound composite tube, and the chopped fibers in each of the layers are randomly oriented along first and second orthogonal directions in said each of the layers;
wherein the composite molding sheet material includes at least one sheet of the composite molding sheet material wound over the filament-wound composite tube, and at least one strip of the composite molding sheet material wound over said at least one sheet of the composite molding sheet material and forming a head on the composite mandrel;

wherein the composite mandrel is suitable for use as a central component of a down-hole zonal isolation tool;

wherein the composite mandrel is capable of sustaining tension in a longitudinal direction of 12,000 psi; and wherein the mandrel is capable of sustaining compression in a radial direction of 40,000 psi.

19. The composite mandrel as claimed in claim 18, wherein the filament-wound composite tube provides a lumen for the composite mandrel.

20. The composite mandrel as claimed in claim 18, wherein an internal cavity of the filament-wound composite tube is threaded to receive a threaded plug for plugging the lumen of the composite mandrel.

21. The composite mandrel as claimed in claim 18, which includes a plug in one end of the filament-wound composite tube, and wherein the plug is sealed in the filament-wound composite tube by the composite molding sheet material wound over and molded over the filament-wound composite tube.

* * * * *

UNITED STATES PATENT AND TRADEMARK OFFICE
CERTIFICATE OF CORRECTION

PATENT NO. : 8,800,605 B2  
APPLICATION NO. : 13/754355  
DATED : August 12, 2014  
INVENTOR(S) : James Barlow and Joel Barlow Page 1 of 1

It is certified that error appears in the above-identified patent and that said Letters Patent is hereby corrected as shown below:

On the Title Page Item (60), "Continuation-in-part" is changed to --Divisional--.

In the Claims

In Claim 1, col. 8, line 34, "comprising;" is changed to --comprising:--.

In Claim 3, col. 8, line 53, "comprising;" is changed to --comprising:--.

In Claim 5, col. 9, line 5, "comprising;" is changed to --comprising:--.

In Claim 7, col. 9, line 32, "layers u s on" is changed to --layers upon--.

Signed and Sealed this
Tenth Day of February, 2015

Michelle K. Lee
*Deputy Director of the United States Patent and Trademark Office*